(12) United States Patent
Ono et al.

(10) Patent No.: US 11,300,526 B2
(45) Date of Patent: Apr. 12, 2022

(54) POSITIONING DEVICE, HOLE INSPECTION DEVICE, POSITIONING METHOD AND HOLE INSPECTION METHOD

(71) Applicant: SUBARU CORPORATION, Tokyo (JP)

(72) Inventors: Ryohei Ono, Tokyo (JP); Tatsuo Nakahata, Tokyo (JP); Masao Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 20 days.

(21) Appl. No.: 16/839,503

(22) Filed: Apr. 3, 2020

(65) Prior Publication Data
US 2020/0378749 A1    Dec. 3, 2020

(30) Foreign Application Priority Data

May 29, 2019 (JP) .............................. JP2019-100098

(51) Int. Cl.
G01N 21/954  (2006.01)
G01B 11/12  (2006.01)

(52) U.S. Cl.
CPC .......... *G01N 21/954* (2013.01); *G01B 11/12* (2013.01)

(58) Field of Classification Search
CPC ... G01N 2021/9542; G01N 2021/9544; G01N 2021/9548; G01N 2021/9546; G01N 21/954; G01B 11/12
See application file for complete search history.

(56) References Cited

U.S. PATENT DOCUMENTS

| 4,861,984 A * | 8/1989 | West ................... G01B 11/026 250/236 |
| 2008/0079933 A1* | 4/2008 | Fukami ............... G01N 21/954 356/237.2 |

(Continued)

FOREIGN PATENT DOCUMENTS

| EP | 2 813 813 A1 | 12/2014 |
| JP | S57-202692 U | 12/1982 |
| JP | S61-030338 A | 2/1986 |

OTHER PUBLICATIONS

Pamphlet of United Sciences, LLC Handheld 3D Scanner, searched o Apr. 9, 2019, URL:http://www.unitedsciences.com/wp-content/uploads/2015/10/AeroscanSpecSheet-Handheld-20150919pm.pdf (2 pgs.).

(Continued)

*Primary Examiner* — Michael P LaPage
(74) *Attorney, Agent, or Firm* — Smith, Gambrell & Russell, LLP

(57) ABSTRACT

According to one implementation, a positioning device positions a hole inspection device to a hole formed in an object. The positioning device includes a guide unit and a detachable member. The guide unit has a positioning hole and a flat supporting face. A cylindrical or columnar positioning member is slidably inserted into the positioning hole. At least a tip of the positioning member is inserted into the hole. A central axis of the positioning hole and a reference line of the hole inspection device for measuring or inspecting the feature of the hole lie on a same straight line. The guide unit is set by contacting the flat supporting face to a surface of the object surrounding the hole or a flat surface of a jig placed on the object. The detachable member attaches a part or all of the guide unit to the hole inspection device.

18 Claims, 9 Drawing Sheets

(56) References Cited

U.S. PATENT DOCUMENTS

| | | | |
|---|---|---|---|
| 2009/0262354 A1* | 10/2009 | Horiuchi | G01N 21/55 |
| | | | 356/445 |
| 2015/0002836 A1 | 1/2015 | Baba et al. | |
| 2019/0271536 A1* | 9/2019 | Haas | G01B 11/12 |
| 2021/0114278 A1* | 4/2021 | Holle | G01N 21/954 |

OTHER PUBLICATIONS

Extended European Search report dated Oct. 5, 2020 in Patent Application No. 20 169 389.2 (10 pages).

\* cited by examiner

POSITIONING DEVICE, HOLE INSPECTION DEVICE, POSITIONING METHOD AND HOLE INSPECTION METHOD

CROSS REFERENCES TO RELATED APPLICATIONS

This application is based upon and claims the benefit of priority from Japanese Patent Application No. 2019-100098, filed on May 29, 2019; the entire contents of which are incorporated herein by reference.

FIELD

Implementations described herein relate generally to a positioning device, a hole inspection device, a positioning method and a hole inspection method.

BACKGROUND

As a handheld inspection device for measuring the inside diameter of a hole, a non-contact device having a bar-shaped inspection probe has been commercialized (for example, see the Handheld 3D Scanner pamphlet by UNITED SCIENCES, LLC. When the diameter of a hole is measured with this inspection device, the bar-shaped inspection probe is inserted into the hole so that a laser light may be irradiated from a light source, attached at the tip of the inspection probe, toward the inner surface of the hole in the 360 degree directions. Then, each reflected light of the laser light reflected on the inner surface of the hole reflects on a conical mirror built in the inspection probe, and each reflected light propagated by a glass rod which composes the inspection probe is imaged with a camera. The reflected lights imaged with the camera become a ring-shape, and the diameter of the hole can be calculated by image analysis of the ring-shaped reflected lights.

Improving the measurement accuracy of the diameter of a hole using this optical hole inspection device requires improving the coaxiality between the central axis of the inspection probe and the central axis of a hole. As a device for positioning an object with center alignment to the central axis of a hole, a centering device which inserts a conical positioning member into the hole is known (for example, refer to Japanese Patent Application Publication JPS61-030338 and Japanese Utility Model Application Publication JPS57-202692).

However, even when a workpiece is positioned with centering a hole using a centering device or the like, it is still necessary to position the inspection probe so that the inspection probe may be centered on the central axis of the hole. Therefore, it is necessary to position the inspection device by fixing the inspection device to a large scale three-dimensional moving apparatus, such as a machine tool or a three-dimensional measuring apparatus, having a moving mechanism in orthogonal three axis directions, in order to measure the diameter of a hole with satisfactory accuracy, although the inspection device is a handheld device.

On the contrary, when a user handles the inspection device by hand for measuring a feature of a hole, such as the diameter, the probe cannot be accurately positioned on the center position of the hole, and thereby the feature of the hole can be measured only with low accuracy. Moreover, when a position of the inspection device is inappropriate, a feature of a hole cannot be measured, which results in an error. Accordingly, proficiency for handling the inspection device is required for a user.

This is the same not only in any non-contact inspection device, by another principle, for measuring or inspecting features of a hole, such as the diameter, with positioning and centering the inspection device to the center position of the hole but also in any contact-type inspection device.

Accordingly, an object of the present invention is to make it possible to measure or inspect at least one feature of a hole, such as a diameter of the hole, with high accuracy without a large scale three-dimensional moving apparatus when the feature of the hole is measured or inspected with positioning an inspection device according to the center position of the hole.

SUMMARY OF THE INVENTION

In general, according to one implementation, a positioning device positions a hole inspection device to a hole to be inspected formed in an object. The hole inspection device measures or inspects a feature of the hole to be inspected. The positioning device includes a guide unit and a detachable member. The guide unit has a positioning hole and a flat supporting face. A cylindrical or columnar positioning member is slidably inserted into the positioning hole. At least a tip of the positioning member is inserted into the hole to be inspected. A central axis of the positioning hole and a reference line of the hole inspection device for measuring or inspecting the feature of the hole to be inspected lie on a same straight line. The guide unit is set by contacting the flat supporting face to a surface of the object surrounding the hole to be inspected or a flat surface of a jig placed on the object. The detachable member attaches a part or all of the guide unit to the hole inspection device.

Further, according to one implementation, a hole inspection device includes the above-mentioned positioning device.

Further, according to one implementation, a method of positioning the hole inspection device includes using the above-mentioned positioning device.

Further, according to one implementation, a method of positioning a hole inspection device to a hole to be inspected formed in an object includes: setting a guide unit, having a positioning hole and a flat supporting face, by attaching a part or all of the guide unit to the hole inspection device with a detachable member and contacting the flat supporting face to a surface of the object surrounding the hole to be inspected or a flat surface of a jig placed on the object; and positioning the hole inspection device to the hole to be inspected by inserting a cylindrical or columnar positioning member into the hole to be inspected and the positioning hole simultaneously. The hole inspection device measures or inspects a feature of the hole to be inspected. The central axis of the positioning hole and a reference line of the hole inspection device lie on a same straight line.

Further, according to one implementation, a hole inspection method includes measuring or inspecting the feature of the hole to be inspected using the hole inspection device positioned by the above-mentioned method.

DETAILED DESCRIPTION

A positioning device and a hole inspection device, a positioning method and a hole inspection method according to implementations of the present invention will be described with reference to accompanying drawings.

(First Implementation)
(Positioning Device and Hole Inspection Device)

Figure 1:
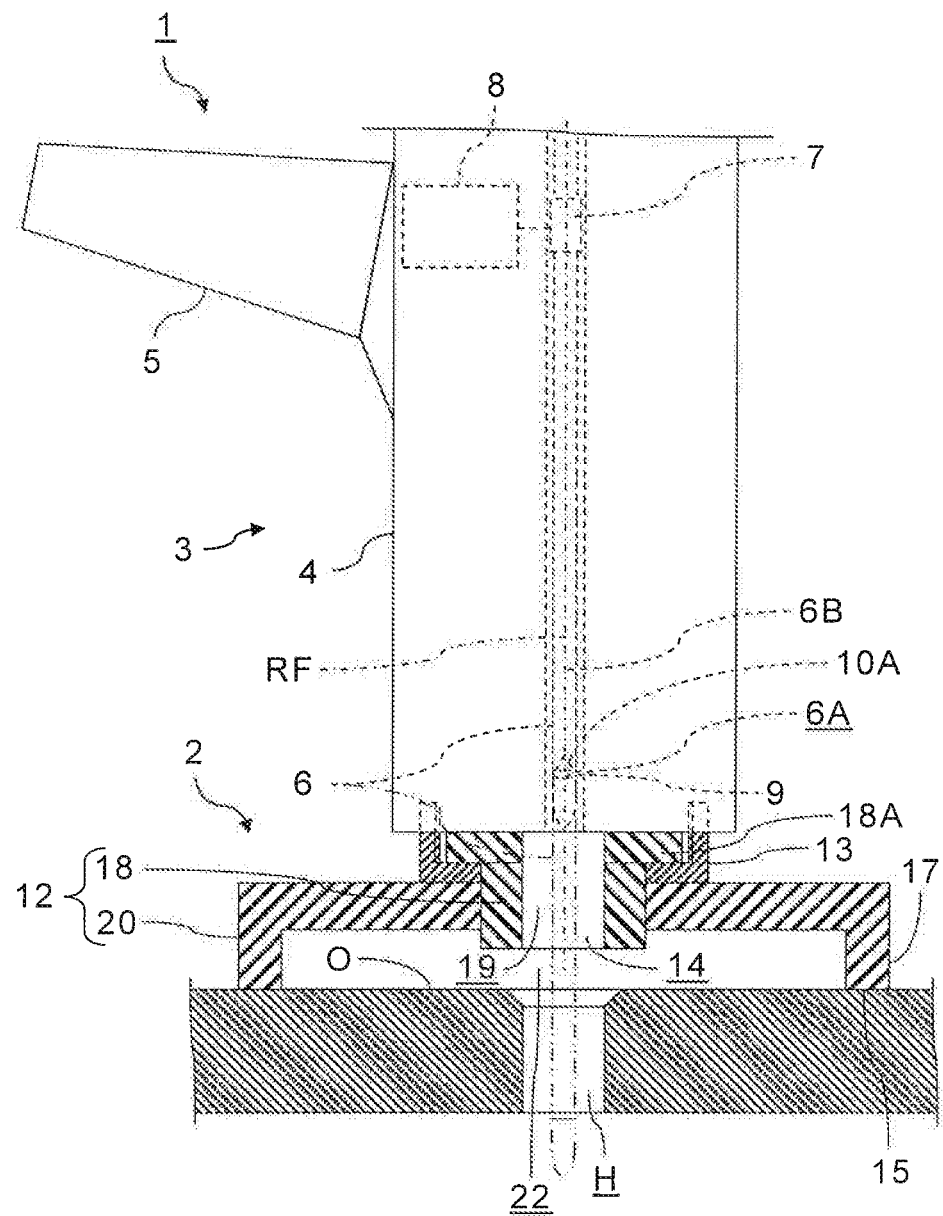
FIG. 1 shows a structure of a hole inspection device having a positioning device according to the first implementation of the present invention.

FIG. 1 shows a structure of a hole inspection device having a positioning device according to the first implementation of the present invention.

A hole inspection device 1 is a handheld device which measures or inspects at least one feature of a hole H to be inspected, formed in an object O. The hole H to be inspected is a through hole or a blind hole which does not penetrate, having a circular cross section and formed so that a central axis might become perpendicular to a flat surface of the object O. In an example shown in FIG. 1, the hole H to be inspected is a through hole which penetrates the object O.

Examples of features of the hole H to be measured or inspected include the diameter of the hole H at each depth, the surface roughness of the inner surface of the hole H at each position, the existence of damage on the inner surface of the hole H and a three-dimensional shape of the inner surface of the hole H. In addition, the edge of the hole H may also be measured or inspected regardless of whether a chamfer, such as a C chamfer or a reverse R chamfer, or a step has been formed on the edge. Therefore, not only a chamfered shape of the edge of the hole H but also a three-dimensional shape of the inner surface of the hole H including the chamfered shape may be obtained.

Such features of the hole H can be measured or detected using the central axis of the hole H as a reference line. Therefore, it is necessary to position the hole inspection device 1 to the hole H in order to measure or detect features of the hole H by the hole inspection device 1. Thus, the hole inspection device 1 is used together with a positioning device 2, and a part or all of the positioning device 2 is attached to the hole inspection device 1 as an attachment. That is, the hole inspection device 1 is composed of a device main body 3 and the positioning device 2.

The device main body 3 is a handheld device which measures or detects features of the hole H to be inspected by setting the central axis of the hole H to a reference line. Therefore, the device main body 3 houses components, necessary to measure or detect features of the hole H to be inspected, in a casing 4, and has a grip 5 for being grasped by hand of a user, on the casing 4.

The positioning device is a device which positions the device main body 3 according to the central axis of the hole H to be inspected. Specifically, the positioning device 2 positions the device main body 3 of the hole inspection device 1 so that a reference line RF defined to the device main body 3 and the central axis of the hole H to be inspected having a circular cross section may become on a same straight line.

The device main body 3 can have configuration according to a measurement principle or a detection principle of features of the hole H with the hole inspection device 1. Although an example of a case where the hole inspection device 1 is an optical inspection device having a non-contact bar-shaped probe 6 will be described henceforth, the hole inspection device 1 can be positioned similarly by attaching a part or all of the positioning device 2 to the hole inspection device 1 not only in a case where the hole inspection device 1 is an inspection device, such as a three-dimensional measuring device, having a contact-type probe, but also a case where the hole inspection device 1 is a type of an inspection device having sensors or the like instead of a probe, so long as the hole inspection device 1 is a handheld inspection device which measures or detects features of the hole H using the central axis of the hole H as a reference line.

The device main body 3 of the hole inspection device 1 exemplified in FIG. 1 has the bar-shaped probe 6, a camera 7 and an information processing circuit 8. The bar-shaped probe 6 is used by inserting the tip of the bar-shaped probe 6 into the inside of the hole H to be inspected. Therefore, the bar-shaped probe 6 can project from the casing 4 of the device main body 3 toward the hole H to be inspected, by a linear moving mechanism, at the time of an inspection while the bar-shaped probe 6 can be housed in the casing 4 after the inspection. Moreover, the bar-shaped probe 6 is composed of a rigid body having certain strength so that the bar-shaped probe 6 may not deform.

Figure 2:
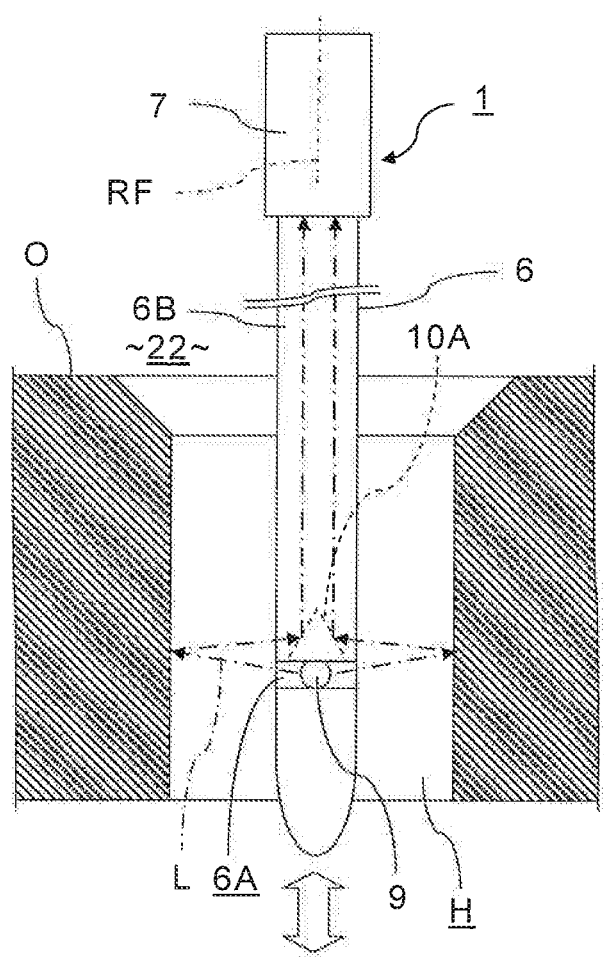
FIG. 2 is an enlarged longitudinal sectional view of the hole to be inspected by the hole inspection device shown in FIG. 1 for explaining an example of the measurement principle of the features of the hole and a detailed configuration of the hole inspection device.

FIG. 2 is an enlarged longitudinal sectional view of the hole H to be inspected by the hole inspection device 1 shown in FIG. 1 for explaining an example of the measurement principle of the features of the hole H and a detailed configuration of the hole inspection device 1.

The tip of the bar-shaped probe 6 has a light source 9, a conical mirror 10A and a circular slit 6A. Meanwhile, the camera 7 is disposed at the other end of the probe 6. Moreover, a portion between the mirror 10A and the camera 7 in the probe 6 is made of a media 6B, such as a glass, which can propagate light.

Accordingly, when the tip of the probe 6 is inserted into the inside of the hole H to be inspected and a laser light L is oscillated from the light source 9, the laser light L is irradiated from the circular slit 6A formed at the tip of the probe 6 towards the inner surface of the hole H to be inspected, in the 360 degree directions, as exemplified in FIG. 2. The reflected lights of the laser light L reflected on the inner surface of the hole H to be inspected enter the probe 6, reflect on the mirror 10A, propagate in an optical path formed by the medium 6B and enter the camera 7. That is, the ring-shaped reflected lights reflected on respective positions of the inner surface at a cross section of the hole H to be inspected reflect on the mirror 10A, and enter the camera 7.

Figure 3:
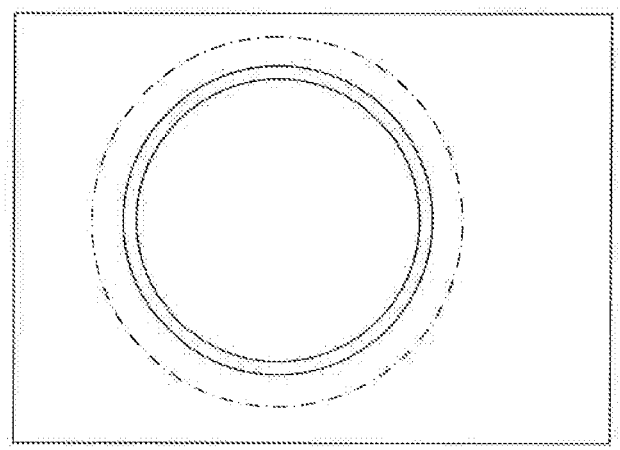
FIG. 3 shows an example of a two-dimensional image obtained by the camera shown in FIG. 1 and FIG. 2.

FIG. 3 shows an example of a two-dimensional image obtained by the camera 7 shown in FIG. 1 and FIG. 2.

When the reflected lights of the laser light L from the inner surface of the hole H to be inspected are imaged by the camera 7 without changing positions of the light source 9 and the mirror 10A in the length direction of the probe 6, a two-dimensional ring-shaped image of the reflected lights can be acquired as shown in FIG. 3. When the central axis of the probe 6 coincides with the central axis of the hole H to be inspected, it can be considered that the ring-shaped image of the reflected lights has a unique relation with the diameter of the hole H to be inspected.

Therefore, when a reference circle corresponding to the diameter of a known reference hole is obtained and calibrated as shown by a dashed-dotted line in FIG. 3, the ring-shaped image of the reflected lights can be compared to the reference circle, and the diameter of the hole H to be inspected can be geometrically calculated based on the distance between the ring-shaped image of the reflected lights and the reference circle. Accordingly, when the reflected lights of the laser light L are imaged by the camera 7 while changing the insertion depth of the probe 6 inside the hole H to be inspected, the respective diameters at different positions in the central axis direction of the hole H can be calculated. That is, cylindrical data can be obtained as three-dimensional shape data showing the shape of the inner surface of the hole H to be inspected.

Figure 4:
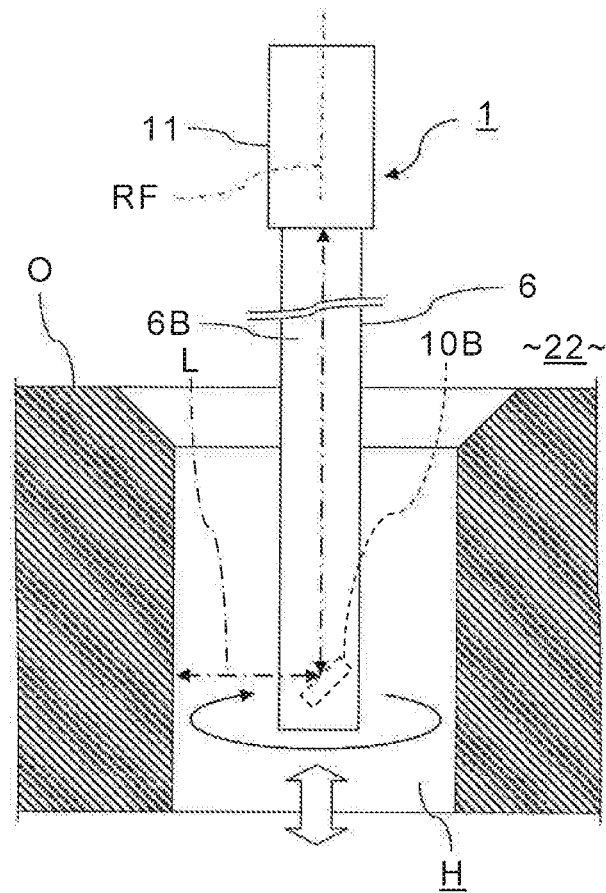
FIG. 4 is an enlarged longitudinal sectional view of the hole to be inspected by the hole inspection device shown in FIG. 1 for explaining another example of the measurement principle of the features of the hole and a detailed configuration of the hole inspection device.

FIG. 4 is an enlarged longitudinal sectional view of the hole H to be inspected by the hole inspection device 1 shown in FIG. 1 for explaining another example of the measurement principle of the features of the hole H and a detailed configuration of the hole inspection device 1.

As exemplified in FIG. 4, such a type of the hole inspection device 1 that has a flat mirror 10B in one end part in the tip side of the bar-shaped probe 6 and an optical signal processing unit 11 including a light source and a photodetector, such as a photoelectric converter, in the other end part in the root side of the probe 6 has been also commercialized. This hole inspection device 1 is configured to rotate only the mirror 10B or the probe 6 together with the mirror 10B around the central axis by a rotating mechanism in addition to a linear moving mechanism.

When a laser light L is output from the light source in the optical signal processing unit 11, the laser light L propagates in the probe 6 made of a media, such as a glass, which forms an optical path of the laser light L. When the laser light L which propagates in the probe 6 reaches the tip portion of the probe 6 inserted inside the hole H to be inspected, the laser light L is reflected on the mirror 10B. As a result, the propagation direction of the laser light L becomes a radial direction of the hole H to be inspected. Thereby, the laser light L can be irradiated towards the inner surface of the hole H to be inspected.

The laser light L irradiated to the inner surface of the hole H to be inspected reflects on the inner surface of the hole H. The reflected light of the laser light L reflected on the inner surface of the hole H to be inspected enters the probe 6 again. The reflected light of the laser light L which has entered the probe 6 reflects on the mirror 10B, propagates in the probe 6, and enters the optical signal processing unit 11. The reflected light of the laser light L which has entered the optical signal processing unit 11 propagates in an optical path branched off by an optical circulator or the like in the optical signal processing unit 11, and is detected by the photodetector.

Accordingly, the distance between a reflection position of the laser light L on the mirror 10B and a reflection position of the laser light L on the inner surface of the hole H to be inspected can be calculated by analyzing the time difference between the oscillation time of the laser light L from the light source and the detection time of the reflected light of the laser light L by the photodetector and/or the interference light of the laser light L oscillated from the light source and the reflected light of the laser light L. Therefore, when the mirror 10B is rotated and moved in the depth direction of the hole H to be inspected, the relative spatial coordinates at each position on the inner surface of the hole H can be obtained. Specifically, point group data on a cylindrical curved surface corresponding to the inner surface of the hole H to be inspected can be obtained as three-dimensional shape data showing the shape of the inner surface of the hole H.

The information processing circuit 8 can be disposed in the hole inspection device 1 as shown in FIG. 2 or FIG. 4 so that image processing of images obtained by the camera 7 or signal processing of detection signals of the reflected lights detected by the photodetector can be performed. As a concrete example, various information processing, such as denoising processing, three-dimensional interpolation processing and error exclusion processing, can be performed.

Thereby, positional coordinates of the inner surface of the hole H to be inspected can be also obtained with a pitch of about 0.05 mm. Therefore, features of the hole H to be inspected, formed on the object O made of not only a metal but also a fiber-reinforced plastics (composite material), with tolerance of +0.1 mm to +0.01, mm can be measured.

It is important to improve the concentricity between the central axis of the hole H to be inspected, and the central axis of the conical mirror 10A or the rotation axis of the planate mirror 10B in order to measure features of the hole H with high accuracy. Therefore, when the central axis of the conical mirror 10A or the rotation axis of the flat mirror 10B lies on the central axis of the probe 6, it is important to make the central axis of the probe 6 and the central axis of the hole H to be inspected become on a same straight line. In the actual hole inspection device 1, it has been confirmed that the calculation accuracy of features, such as the diameter, of the hole H to be inspected sometimes deteriorate, or the features of the hole H sometimes become unmeasurable when an error between the central axis of the probe 6 and the central axis of the hole H to be inspected is large.

Accordingly, the central axis of the probe 6 can be defined as the reference line RF of the hole inspection device 1. Then, the positioning device 2 can be configured to position the device main body 3 so that the reference line RF of the hole inspection device 1 and the central axis of the hole H to be inspected may be on a same straight line.

The positioning device 2 can be composed of a guide unit 12 and a detachable member 13 as exemplified in FIG. 1. The guide unit 12 positions the device main body 3 so that the reference line RF of the hole inspection device 1 and the central axis of the hole H to be inspected may become on a same straight line. The detachable member 13 attaches a part or all of the guide unit 12 to the device main body 3 of the hole inspection device 1.

In an example shown in FIG. 1, the detachable member 13 is composed of a cylindrical member of which one end is an open end having a female thread on the inner surface while the other end has a through hole at the center, i.e., forms an annular end face around the through hole. The detachable member 13 is detachably fixed to the casing 4 by fastening the female thread of the detachable member 13 to a male thread formed on the casing 4 of the device main body 3. Then, the guide unit 12 is partially attached to the casing 4 by housing a part of the guide unit 12 inside the detachable member 13.

The guide unit 12 has a positioning hole 14 and at least one supporting face 15. The central axis of the positioning hole 14 and the reference line RF of the hole inspection device 1 are made to be on a same straight line. Each supporting face 15 is a flat face for setting the guide unit 12 by being contacted to a flat surface of the object O surrounding the hole H to be inspected. Note that, surfaces of portions of the object O which do not contact to any supporting face 15 of the guide unit 12 may not be flat.

Figure 5:
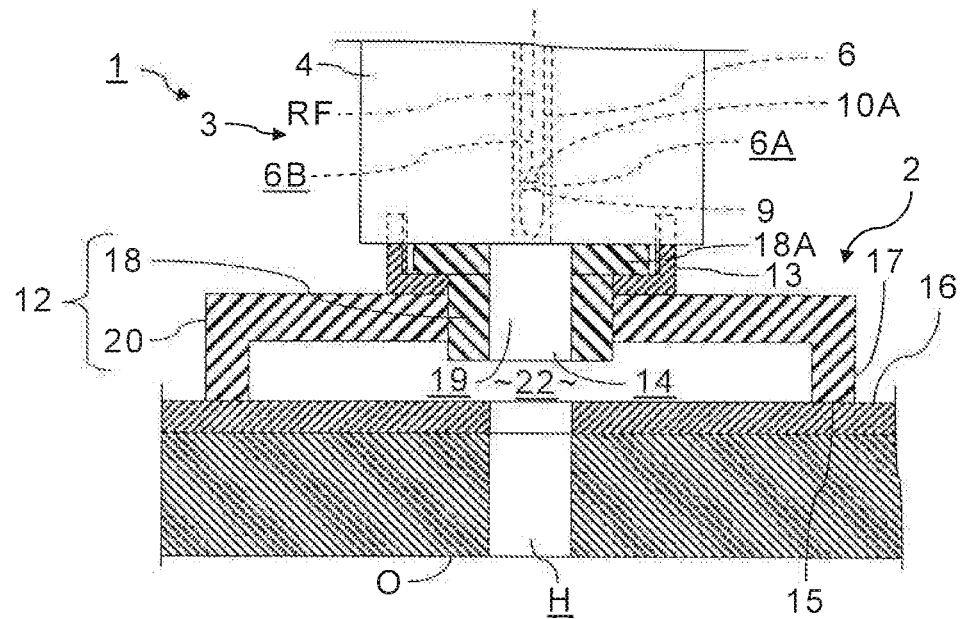
FIG. 5 shows an example of setting the guide unit shown in FIG. 1 to a jig placed on the object.

FIG. 5 shows an example of setting the guide unit 12 shown in FIG. 1 to a jig 16 placed on the object O.

As exemplified in FIG. 5, each supporting face 15 of the guide unit 12 may be contacted and set with and on a flat surface of the jig 16, such as a drilling plate, placed on the object O, instead of directly contacting each supporting face 15 of the guide unit 12 with the surface of the object O. In this case, after the hole H to be inspected has been drilled using the jig 16, such as a drilling plate, it becomes possible to set the hole inspection device 1 promptly to inspect features of the hole H to be inspected.

Note that, when the surface of the object O surrounding the hole H to be inspected is exposed, it becomes possible to measure features, such as the three-dimensional shape, of the edge of the hole H. In other words, it is necessary to form a space on the surface of the object O surrounding the hole H to be inspected in order to measure features of the edge of the hole H.

Accordingly, at least one supporting column 17 can be formed in the guide unit 12, and the supporting face 15 can be formed as the end face of each supporting column 17 so that the guide unit 12 may not contact with at least the edge of the hole H to be inspected. Thereby, the edge of the hole H to be inspected can be exposed to a space.

In an example shown in FIG. 1, the guide unit 12 has been composed of a stepped bushing 18 and a guide jig 20. The stepped bushing 18 has the positioning hole 14. Meanwhile, the guide jig 20 has at least one supporting column 17 and a through hole 19 for inserting the bushing 18.

The diameter of one end of the stepped bushing 18 is larger than the diameter of the through hole of the detachable member 13 while the diameter of the other end of the bushing 18 corresponds to the diameter of the through hole of the detachable member 13 with tolerance for a clearance fit. Accordingly, a disk-like portion 18A having the larger diameter of the bushing 18 can be housed inside the detachable member 13 while a portion having the smaller diameter can be projected from the through hole of the detachable member 13. As a result, the bushing 18 can be attached to the casing 4 of the device main body 3 by the detachable member 13 so that the bushing 18 can be detached and exchanged. The bushing 18 is fixed to the casing 4 of the device main body 3 by the detachable member 13 so that the central axis of the positioning hole 14 and the reference line RF of the hole inspection device 1 may become on a same straight line.

Figure 6:
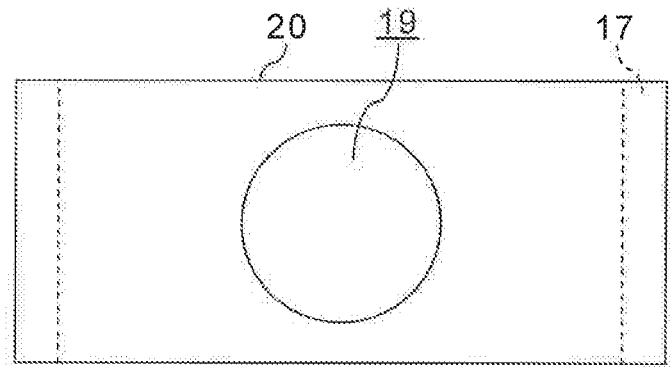
FIG. 6 is a top view showing an example of a shape of the guide jig shown in FIG. 1.
Figure 7:
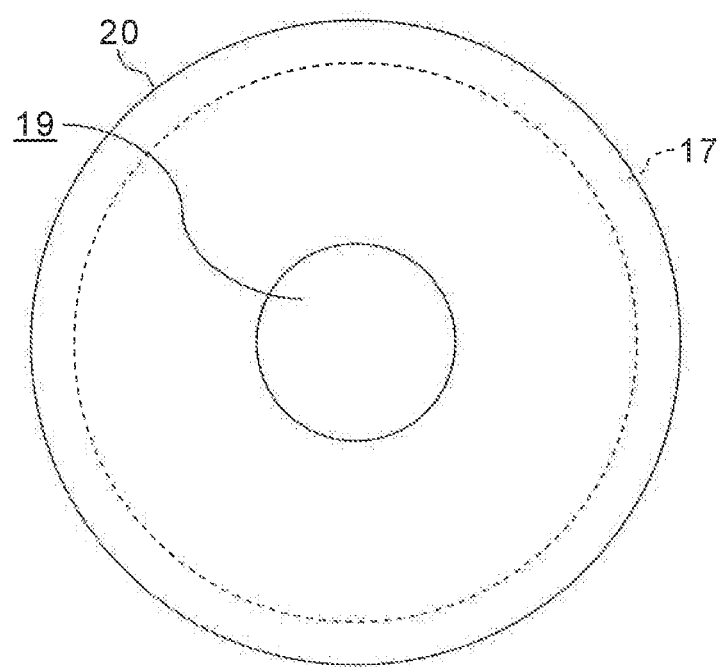
FIG. 7 is a top view showing another example of a shape of the guide jig shown in FIG. 1.

FIG. 6 is a top view showing an example of a shape of the guide jig 20 shown in FIG. 1, and FIG. 7 is a top view showing another example of a shape of the guide jig 20 shown in FIG. 1.

The guide jig 20 may have a plurality of the supporting columns 17 as exemplified in FIG. 6. Alternatively, the guide jig 20 may have the single cylindrical supporting column 17 as exemplified in FIG. 7. When the guide jig 20 has the plurality of the supporting columns 17 as exemplified in FIG. 6, a user can visually confirm the edge of the hole H to be inspected.

The diameter of the through hole 19 of the guide jig 20 corresponds to the portion having the smaller diameter of the bushing 18, which projects from the detachable member 13, with tolerance for a clearance fit. Accordingly, the tip of the bushing 18 attached to the device main body 3 can be inserted into the through hole 19 of the guide jig 20 placed on the object O as exemplified in FIG. 1.

Moreover, the supporting face 15 is formed on each supporting column 17 so that the supporting face 15 may become perpendicular to the central axis of the positioning hole 14. Therefore, when the guide jig 20 is placed on a portion, of which surface is flat, of the object O, the central axis of the through hole 19 of the guide jig 20 and the positioning hole 14 become perpendicular to the surface of the object O. As a result, the central axis of the hole H to be inspected, formed on the object O so that the central axis may be perpendicular to the surface of the object O, becomes parallel to the central axis of the through hole 19 of the guide jig 20 and the positioning hole 14.

Figure 8:
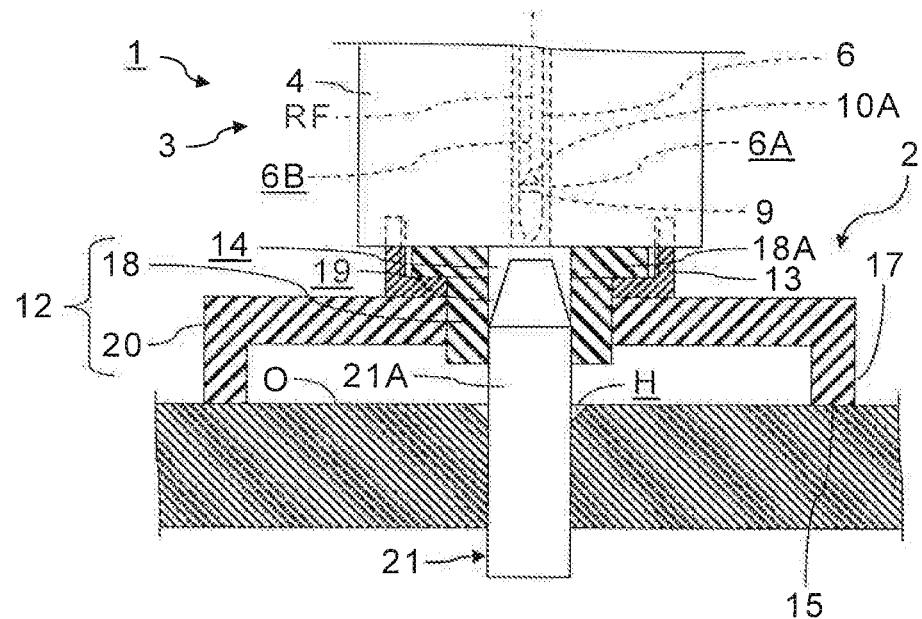
FIG. 8 is a longitudinal sectional view showing a state where one positioning member has been inserted into the positioning hole of the bushing and the hole to be inspected shown in FIG. 1.

FIG. 8 is a longitudinal sectional view showing a state where one positioning member 21 has been inserted into the positioning hole 14 of the bushing 18 and the hole H to be inspected shown in FIG. 1.

As shown in FIG. 8, the positioning hole 14 formed as a through hole having a circular cross section and centering the center axis of the bushing 18 is used for slidably inserting a pin 21A which is also inserted into the hole H to be inspected, as the cylindrical or columnar positioning member 21, composed of at least one of a positioning cylinder and a positioning column, having a circular cross section. The pin 21A may be a part of the guide unit 12, or may be a general-purpose product. The diameter of the pin 21A is determined so that the diameter of the pin 21A and the hole H to be inspected may have tolerance for a clearance fit. Therefore, the diameter of the positioning hole 14 is also determined so that the diameter of the positioning hole 14 and the diameter of the pin 21A may have tolerance for a clearance fit.

As described above, when the single and common pin 21A is inserted into both the hole H to be inspected and the positioning hole 14 of the bushing 18 attached to the device main body 3, the central axis of the positioning hole 14 and the reference line RF of the hole inspection device 1 can be on the same straight line as the central axis of the hole H to be inspected. Specifically, simultaneously inserting the cylindrical or columnar positioning member 21 in the positioning hole 14 and the hole H to be inspected makes it possible to position the hole inspection device 1 to the hole H.

Note that, although the diameter of the portion of the pin 21A inserted in the positioning hole 14 is same as the diameter of the portion of the pin 21A inserted into the hole H to be inspected, in an example shown in FIG. 8, one diameter may be different from the other. That is, the pin 21A may be a stepped pin. When the pin 21A is a stepped pin, it is necessary to make the diameter of the positioning hole 14 smaller than the diameter of the hole H to be inspected.

Figure 9:
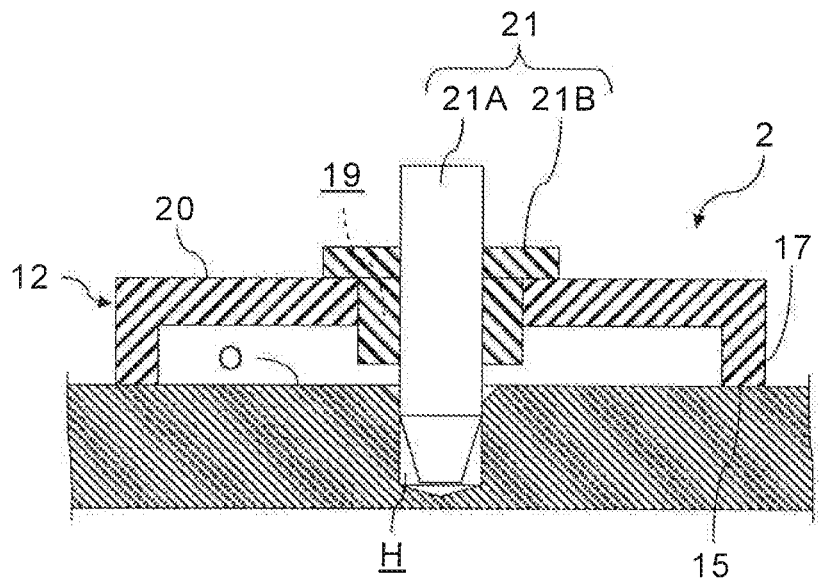
FIG. 9 is a longitudinal sectional view showing an example of inserting a common positioning member, composed of parts, into the through hole of the guide jig and the hole to be inspected shown in FIG. 1.

FIG. 9 is a longitudinal sectional view showing an example of inserting a common positioning member 21 composed of parts, into the through hole 19 of the guide jig 20 and the hole H to be inspected shown in FIG. 1.

As exemplified in FIG. 9, when the hole H to be inspected is a blind hole, the pin 21A cannot be inserted into the hole H from the side where the device main body 3 of the hole inspection device 1 is not disposed. Moreover, depending on a structure of the object O, the pin 21A may not be inserted into the hole H from the side where the device main body 3 of the hole inspection device 1 is not disposed.

In such a case, before the device main body 3 to which the bushing 18 is attached by the detachable member 13 is set to the guide jig 20, the pin 21A can be inserted into the hole H from the side in which the device main body 3 of the hole inspection device 1 is to be disposed as shown in FIG. 9. When the diameter of the pin 21A and the diameter of the through hole 19 of the guide jig 20 do not have a tolerance for a clearance fit, the positioning member 21 can be composed of a stepped bushing 21B and the pin 21A so that the common positioning member 21 can be inserted in the through hole 19 of the guide jig 20 and the hole H to be inspected simultaneously as exemplified in FIG. 9. As a matter of course, the positioning member 21 may be composed of one stepped pin so that the single stepped pin can be simultaneously inserted into both the through hole 19 of the guide jig 20 and the hole H to be inspected.

In this case, the through hole 19 of the guide jig 20 and the through hole at the center of the stepped bushing 21B function as positioning holes for simultaneously inserting the positioning member 21 into the hole H to be inspected. After the guide jig 20 has been positioned by inserting the positioning member 21 into the positioning hole of the guide jig 20, the bushing 18 attached to the device main body 3 is set to the through hole 19 of the guide jig 20 by removing the positioning member 21.

Also in a case where the device main body 3 is positioned while the device main body 3 has been set to the guide jig 20 as shown in FIG. 8, the pin 21A is pulled out from the positioning hole 14 and the hole H to be inspected before the probe 6 is inserted into the hole H in order to avoid interference of the pin 21A with the probe 6. Therefore, regardless of the insertion direction of the positioning member 21 into the hole H to be inspected, the positioning member 21 is pulled out from the positioning hole 14 and the hole H before the probe 6 is inserted into the hole H. When the positioning member 21 is pulled out to a position sufficiently away from the hole H to be inspected, it also becomes possible to measure features of the hole H including the shape of the edge.

When features including the shape of the edge of the hole H to be inspected are measured, it is important to appropriately determine the shape and position of each supporting column 17 as mentioned above. When features of the hole H to be inspected are measured by irradiating the inner surface of the hole H with the laser light L as exemplified in FIG. 2 or FIG. 4, it is appropriate to determine the shape and position of each supporting column 17 so that the laser light L may not be reflected on a portion other than the inner surface of the hole H, or the laser light L may be reflected on a position away from the inner surface of the hole H to the extent that it is determined that the position is not on the inner surface of the hole H even if the laser light L is reflected on a portion other than the inner surface of the hole H.

Thus, it is appropriate to form each supporting column 17 to the guide unit 12 so that at least a columnar space 22, adjacent to the supporting column 17 side of the guide unit 12, having the diameter larger than each of the diameters of the hole H to be inspected and the positioning hole 14, and of which the central axis lies on the same straight line as that of the hole H and the positioning hole 14, may not be interrupted. The columnar space 22 can be made adjacent to the hole H by inserting the positioning member 21 into the positioning hole 14 and the hole H. Note that, the guide jig 20 may be fixed to the object O by clamps after the guide jig 20 has been positioned.

(Positioning Method and Hole Inspection Method)

Next, a method of positioning the hole inspection device 1 using the positioning device 2, and a hole inspection method of measuring features of the hole H to be inspected, with the hole inspection device 1 which has been positioned in the positioning method, will be described.

When features of the hole H to be inspected, formed in the object O, are measured, a part or all of the guide unit 12 is attached to the hole inspection device 1 by the detachable member 13. For example, as exemplified in FIG. 1, the bushing 18 having a step can be attached to the casing 4 of the device main body 3 by the detachable member 13. Meanwhile, the guide jig 20 is placed on the object O by contacting the supporting face 15 formed on an end face of each supporting column 17 of the guide jig 20 to the surface of the object O.

When the pin 21A cannot be inserted into the hole H of the object O from the back side, the positioning member 21 composed of the stepped bushing 21B and the pin 21A is simultaneously inserted into the through hole 19 of the guide jig 20 and the hole H to be inspected as exemplified in FIG. 9. Thereby, each supporting column 17 of the guide jig 20 is slid to the surface of the object O, and consequently the central axis of the through hole 19 of the guide jig 20 which functions as a positioning hole can be coincided with the central axis of the hole H to be inspected.

When the guide jig 20 has been positioned, the positioning member 21 is removed from the guide jig 20, and subsequently the stepped bushing 18 attached to the device main body 3 is inserted into the through hole 19 of the guide jig 20. Thereby, the hole inspection device 1 can be positioned as exemplified in FIG. 1. Specifically, the device main body 3 can be set to the guide jig 20 in a state where the reference line RF defined in the hole inspection device 1 and the central axis of the hole H to be inspected lie on a same straight line.

On the other hand, when the pin 21A can be inserted into the hole H from the back side of the object O, the stepped bushing 18 attached to the device main body 3 is inserted into the through hole 19 of the guide jig 20 which has not been positioned. Then, the pin 21A is inserted into both the hole H of the object O and the positioning hole 14 of the bushing 18 from the back side of the object O as exemplified in FIG. 8. Thereby, each supporting column 17 of the guide jig 20 is slid to the surface of the object O, and consequently the central axis of the positioning hole 14 of the bushing 18 can be coincided with the central axis of the hole H to be inspected.

When the device main body 3 to which the bushing 18 has been attached and the guide jig 20 have been positioned, the pin 21A is pulled out from the hole H of the object O and the positioning hole 14 of the bushing 18. Thereby, the hole inspection device 1 can be positioned as exemplified in FIG. 1. Specifically, the device main body 3 can be set to the guide jig 20 in a state where the reference line RF defined in the hole inspection device 1 and the central axis of the hole H to be inspected lie on a same straight line.

When the hole inspection device 1 has been positioned, the inspection of the hole H can be started. When the hole H is inspected, the probe 6 moves from the casing 4 of the device main body 3 toward the inside of the hole H. Then, the laser light L is irradiated on the inner surface of the hole H from the tip of the probe 6. The reflected light of the laser light L reflected on the inner surface of the hole H enters the probe 6 and the camera 7 as exemplified in FIG. 1 and FIG. 2 or the optical signal processing unit 11 as exemplified in FIG. 4.

Then, features of the hole H, such as a three-dimensional shape, can be obtained based on images of the reflected lights of the laser lights L obtained by the camera 7 or a signal-processing result obtained by the optical signal processing unit 11. Information processing for obtaining the features of the hole H may be performed by the information processing circuit 8 built in the device main body 3 or by a device including an external information processing circuit coupled to the device main body 3.

(Effects)

As described above, the positioning device 2, the hole inspection device 1, the positioning method and the hole inspection method can position the device main body 3 by attaching a part of the guide unit 12 having the positioning hole 14 to the device main body 3 and inserting the pin 21A into both the hole H to be inspected and the positioning hole 14 simultaneously. Accordingly, the handheld hole inspection device 1 can be simply positioned according to the central axis of the hole H, without using a large-scale three-dimensional moving apparatus. As a result, features of the hole H can be measured or inspected with high accuracy. As a practical example, features, such as a shape, of the hole H of which tolerance in the diameter is not less than ±0.01 mm and not more than ±0.1 mm can be measured or inspected.

(Second Implementation)

Figure 10:
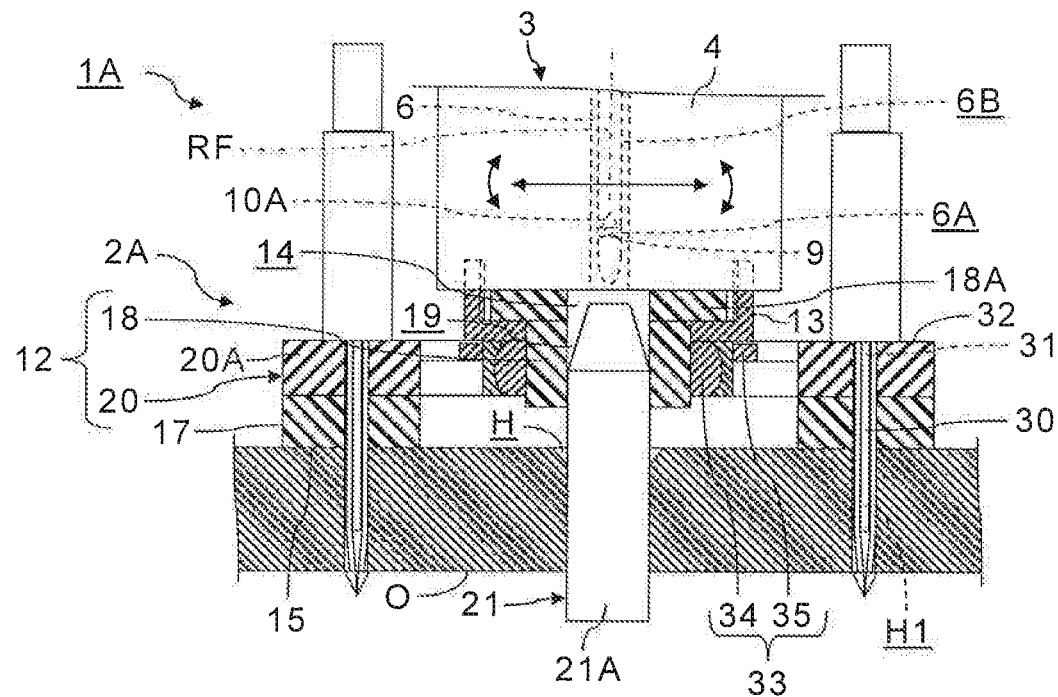
FIG. 10 shows a structure of a hole inspection device having a positioning device according to the second implementation of the present invention.
Figure 11:
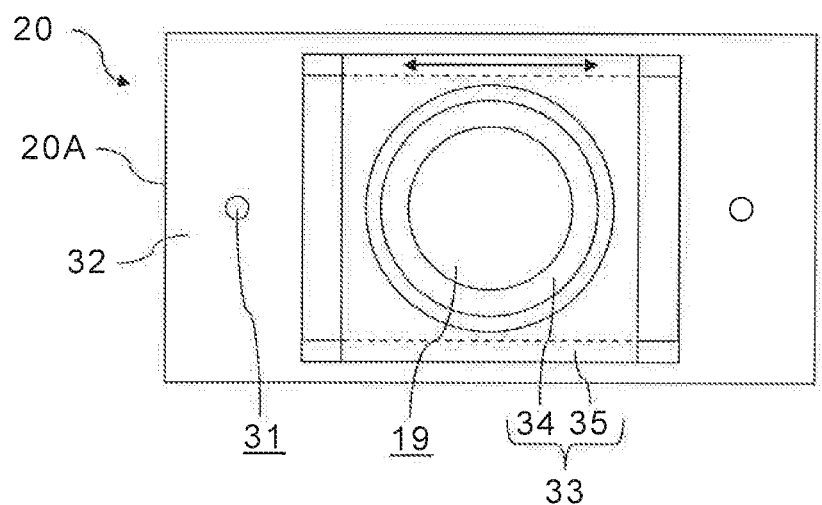
FIG. 11 is a top view of a guide jig included in the positioning device shown in FIG. 10.

FIG. 10 shows a structure of a hole inspection device 1A having a positioning device 2A according to the second implementation of the present invention, and FIG. 11 is a top view of a guide jig 20 included in the positioning device 2A shown in FIG. 10.

A positioning device 2A of a hole inspection device 1A in the second implementation shown in FIG. 10 and FIG. 11 is different from the positioning device 2 in the first implementation in a point that the guide jig 20 can be positioned using at least two holes H1 formed in the object O separately to the hole H to be inspected, and a point that the position and direction of the through hole 19 of the guide jig 20 for inserting the bushing 18 attached to the device main body 3 can be adjusted. Other structures and actions of the positioning device 2A in the second implementation do not substantially differ from those of the positioning device 2 in the first implementation. Therefore, same signs are attached to the same elements and corresponding elements, and explanation thereof is omitted.

When the hole H to be inspected and the holes H1 are aligned on the object O, i.e., the central axis of the hole H to be inspected and the respective central axes of the holes H1 are disposed on a same plane, the guide jig 20 can be positioned to the object O by utilizing the holes H1.

Specifically, at least one member 32, composed of at least one plate, at least one block, bushings, bearings or the like, having insertion holes 31 for inserting pins 30, inserted into the holes H1 of the object O respectively, can be included in the guide jig 20. In other words, the insertion holes 31 can be formed in the member 32 or the members 32 which compose the guide jig 20 so that the insertion holes 31 may become coaxial to the holes H1 of the object O respectively.

In this case, the member 32 or the members 32 can be positioned to the object O by inserting the common pins 30 into not only the two or more holes H1 formed in parallel in the object O so that the central axes of the holes H1 and the central axis of the hole H may become on a same plane, but the insertion holes 31 corresponding to the holes H1 respectively. Theoretically, the member 32 or the members 32 can be positioned to the object O by respectively inserting the two pins 30 into the two holes H1 aligned with the hole H on the object O as well as the two insertion holes 31 of the member 32 or the members 32, coaxial to the two holes H1 respectively, as exemplified in FIG. 10 and FIG. 11.

Each pin 30 inserted in the insertion hole 31 can be composed of not only a typical columnar pin without a step but also a columnar or cylindrical part, such as a pin bolt, which can be utilized as the pin 30. When pin bolts are used, the member 32 or the members 32 of the guide jig 20 can be fixed to the object O by fastening nuts.

In an example shown in FIG. 10, a wedgelock temporary fastener has been used as each pin 30. A wedgelock temporary fastener is a fastener which can fix two objects to each other without fastening a nut by being inserted into holes formed in the two objects from one direction, as described in documents, such as Japanese Patent Application Publication JP 2013-068297 and Japanese Patent Application Publication JP 2013-068298 for example.

A wedgelock temporary fastener is configured so that the thickness of a tip part having an arrowhead shape may become large when a columnar grip is normally rotated while the thickness of the tip part may become thin when the grip is reversely rotated. Accordingly, when a wedgelock temporary fastener is used as each pin 30, the member 32 or the members 32 of the guide jig 20 can be fixed to the object O from the side in which the device main body 3 is disposed.

When the diameter of the hole H1 of the object O into which the pin 30 is inserted is different from the diameter of the insertion hole 31 formed in the member 32 of the guide jig 20, the pin 30 may be composed of a stepped pin bolt or the like, or the pin 30 may be inserted from the back side of the object O.

Moreover, the insertion holes 31 may be formed coaxially to the two holes H1 disposed in one side of the hole H to be inspected so that the member 32 or the members 32 can be positioned to the object O by the pins 30. Nevertheless, the two holes H1 are often formed in both sides of the hole H line-symmetrically as exemplified in FIG. 10. There is also a case where the four holes H1 are disposed at positions interposing the hole H and having an equal distance from the central axis of the hole H. In such a case, the two holes H1 of which central axes and the central axis of the hole H are on a same plane can be selected for inserting the pins 30.

When the pins 30 are inserted into the two holes H1 respectively, the central axis of the hole H to be inspected and the central axes of the insertion holes 31 of the member 32 or the members 32 into which the two pins 30 have been inserted become on a same plane ideally. Therefore, when the member 32 or the members 32 having the insertion holes 31 are included in the guide jig 20 so that the distances between the central axis of the through hole 19 for inserting the bushing 18 attached to the device main body 3 and the central axes of the insertion holes 31 of the member 32 or the members 32 may be same as the distances between the hole H to be inspected and the holes H1, the central axis of the bushing 18 and the central axis of the hole H to be inspected can be on a same straight line only by inserting the two pins 30 into the insertion holes 31 of the member 32 or the members 32 in addition to the holes H1 of the object O respectively.

Therefore, the two central axes of the insertion holes 31 may be set to the reference lines RF of the hole inspection device 1, and the two insertion holes 31 of the member 32 or the members 32 can be used as positioning holes. In that case, the two pins 30 functions as positioning members respectively.

Actually, a positional error between the hole H to be inspected and each hole H1 is often larger than an error in the diameter of the hole H to be inspected. Therefore, inserting the common pin 21A, which is the positioning member 21, into both the positioning hole 14 of the bushing 18 attached to the device main body 3 and the hole H to be inspected, at the same time, from the back side of the object O, as exemplified in FIG. 10, similarly to the first implementation, leads to satisfying accuracy required for an inspection of the hole H. As a matter of course, the positioning member 21 composed of the stepped bushing 21B and the pin 21A as exemplified in FIG. 9, or the positioning member 21 composed of a stepped pin or the like may be inserted into both the through hole 19 of the guide jig 20 and the hole H from the device main body 3 side simultaneously.

When the positioning member 21 is inserted into the hole H to be inspected in a state where the pins 30 have been inserted into the holes H1 of the object O, a large positional error of the hole H makes it difficult to insert the positioning member 21 into both the through hole 19 of the guide jig 20 and the hole H. Accordingly, it is practical to allow fine adjustment of the position of the through hole 19 of the guide jig 20. In addition, the angle of the central axis of the through hole 19 of the guide jig 20 may be finely adjustable for a possible large angular error of the central axis of the hole H.

In that case, an adjustment mechanism 33 for adjusting the position and the direction of the through hole 19 is included in the guide jig 20 as exemplified in FIG. 10 and FIG. 11. In an example shown in FIG. 10 and FIG. 11, the adjustment mechanism 33 which can adjust the position of the through hole 19 in one direction and the direction of the central axis of the through hole 19 has been included in the guide jig 20. As a matter of course, an adjustment mechanism which can adjust the position of the through hole 19 in two directions may be included in the guide jig 20.

The adjustment mechanism 33 for adjusting the direction of the through hole 19 can be composed of a spherical slide bearing 34, for example. Although the spherical slide bearing 34, which is also called a pillow ball or a pillow ball joint, is originally used as a joint for a link mechanism, the through hole 19 for inserting the bushing 18 can be formed by the cylindrical bearing surface of the spherical slide bearing 34.

In this case, the direction of the through hole 19 formed in the guide jig 20 can be changed adjustably. Accordingly, the direction of the through hole 19 can be adjusted so that the direction of the central axis of the through hole 19 may become same as that of the central axis of the hole H to be inspected. Thereby, it becomes possible to smoothly insert the positioning member 21 into both the through hole 19 of the guide jig 20 or the positioning hole 14 of the bushing 18, and the hole H to be inspected even in a case where the direction of the central axis of the hole H has an error and is not precisely perpendicular to the surface of the object O.

Note that, in a case of inserting the positioning member 21 into the hole H from the device main body 3 side as exemplified in FIG. 9, it is essential to insert the bushing 18 attached to the device main body 3 into the through hole 19 without changing the direction of the through hole 19 after pulling out the positioning member 21 from the hole H. Accordingly, the direction of the through hole 19 may be unchangeable without applying force by decreasing fitting tolerance of the spherical slide bearing 34. Alternatively, a stopper may be attached to the spherical slide bearing 34 so that the adjusted direction of the through hole 19 can be fixed.

On the other hand, the adjustment mechanism 33 for adjusting the position of the through hole 19 of the guide jig 20 can be composed of a slide member 35 which can be slid along a groove or a stepped face formed in a main body 20A of the guide jig 20, for example. In an example shown in FIG. 10 and FIG. 11, the rectangular plate-like slide member 35 can be moved in parallel, on a stepped face formed on the main body 20A of the guide jig 2, in a direction which connects the two insertion holes 31 of the member 32 for inserting the pins 30 to each other.

The spherical slide bearing 34 forming the through hole 19 has been embedded in the slide member 35. Accordingly, the position of the through hole 19 can be moved in parallel relatively to the supporting columns 17, the member 32 having the insertion holes 31 for inserting the pins 30, and the like, in addition to adjusting the direction of the through hole 19. That is, the position of the through hole 19 can be moved in parallel in a direction perpendicular to the central axis of the positioning hole 14.

A mechanism, such as the slide member 35, for sliding the position of the through hole 19 can be included in the guide jig 20 regardless of whether a mechanism, such as the spherical slide bearing 34, for adjusting the direction of the through hole 19 is included. Therefore, a bushing which forms the through hole 19 may be pressed into the slide member 35. Alternatively, the through hole 19 may be directly formed in the slide member 35 composed of a plate, a block or the like. That is, the guide jig 20 can include the adjustment mechanism 33 serving as an adjuster which moves the spherical slide bearing 34 or another member composed of a plate, a block, a bushing or the like, forming the through hole 19, in parallel, relatively to the member 32 or the members 32 having the insertion holes 31 for inserting the pins 30, in the arrangement direction of the insertion holes 31.

Thereby, even when the position of the hole H to be inspected is displaced in the arrangement direction of the holes H1, the positioning member 21 can be smoothly inserted into both the hole H, and the through hole 19 of the guide jig 20 or the positioning hole 14 of the bushing 18.

Note that, the position of the through hole 19 may be adjustable in the direction perpendicular to the arrangement direction of the holes H1. Nevertheless, when holes are drilled along a same straight line, an error in distance between adjacent holes is generally larger than a positional error between each hole and the straight line. Accordingly, even when the position of the through hole 19 can be moved in parallel only in the arrangement direction of the holes H1 as exemplified in FIG. 10 and FIG. 11, the influence due to an error of the relative position of the hole H to each hole H1 can be reduced sufficiently, and thereby the positioning member 21 can be smoothly inserted into both the through hole 19 of the guide jig 20 or the positioning hole 14 of the bushing 18, and the hole H.

Moreover, the member 32 or the members 32 having the insertion holes 31 for inserting the pins 30 may also be movable in parallel relatively to portions of the guide jig 20, such as the supporting columns 17. Alternatively, at least one of the insertion holes 31 of the pins 30 may be a long hole or a through groove, instead of a hole having a circular cross section. In that case, even when the holes H of the objects O whose distances from the holes H1 are different from each other are to be inspected, the pins 30 can be inserted into both the insertion holes 31 and the holes H1. When the member 32 or the members 32 forming the insertion holes 31 are made slidable, it is reasonable to make the slide direction be the arrangement direction of the insertion holes 31 and the holes H1, which also leads to simplification in structure of the guide jig 20.

According to the above-mentioned positioning device 2A in the second implementation, positioning of the device main body 3 itself becomes easy since the guide jig 20 can be positioned by utilizing the holes H1 formed in the object O. For example, the through hole 19 of the guide jig 20 for inserting the bushing 18 attached to the device main body 3 can be positioned one-dimensionally. That is, positioning directions of the through hole 19 of the guide jig 20 can be limited to the arrangement direction of the holes H1.

Moreover, even when the central axis of the hole H to be inspected is slanted slightly, the positioning member 21 can be inserted into the hole H so that the hole inspection device 1 can be positioned, by forming the through hole 19 of the guide jig 20 by the spherical slide bearing 34 or the like.

(Third Implementation)

Figure 12:
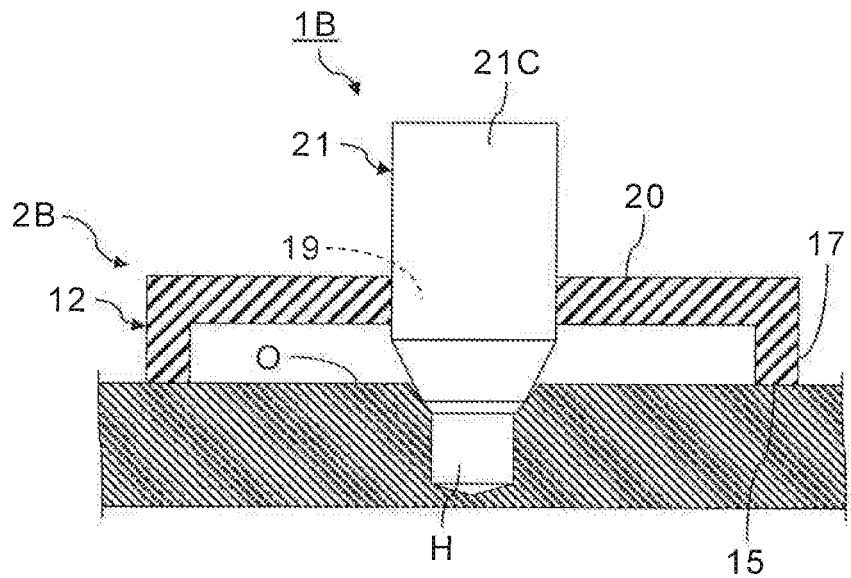
FIG. 12 is a longitudinal sectional view of the vicinity of the hole to be inspected showing a method of positioning a guide jig composing a positioning device of a hole inspection device according to the third implementation of the present invention.

FIG. 12 is a longitudinal sectional view of the vicinity of the hole H to be inspected showing a method of positioning a guide jig 20 composing a positioning device 2B of a hole inspection device 1B according to the third implementation of the present invention.

A positioning device 2B of a hole inspection device 1B in the third implementation shown in FIG. 12 is different from the positioning device 2 in the first implementation in a point that the shape of the tip of the cylindrical or columnar positioning member 21 is a truncated cone, and the guide jig 20 is positioned by inserting only the tip of the positioning member 21 into the hole H to be inspected. Other structures and actions of the positioning device 2B in the third implementation do not substantially differ from those of the positioning device 2 in the first implementation. Therefore, only the guide jig 20, the positioning member 21, and the object are illustrated, and same signs are attached to the same elements and corresponding elements with omitting explanation thereof.

As shown in FIG. 12, a cylindrical or columnar tapered pin 21C whose diameter gradually decreases toward a tip, having a portion with a constant diameter can be used as the positioning member 21. A taper angle of a portion whose shape is an inverted truncated cone at the tip of the tapered pin 21C is determined to an angle smaller than a chamfered angle of a C-chamfer which may be formed on the edge of the hole H to be inspected.

Consequently, the tip of the tapered pin 21C can be pressed to the inside of the hole H to be inspected so that the shape of a contact portion between the portion, of which shape is the inverted truncated cone, at the tip of the tapered pin 21C and the edge of the hole H may become circular, regardless of whether the edge of the hole H is chamfered. Thereby, each supporting column 17 of the guide jig 20 can be slid to the surface of the object O so that the central axis of the through hole 19 of the guide jig 20 which functions as a positioning hole can be coincided with the central axis of the hole H to be inspected. That is, the device main body 3 can also be positioned as a result, by positioning the guide jig 20 with centering the hole H to be inspected and inserting the bushing 18 attached to the device main body 3 into the through hole 19 of the positioned guide jig 20.

Note that, the tapered pin 21C of which tip tapers can also be used as the positioning member 21 in the second implementation. Specifically, the guide jig 20 and the device main body 3 can be positioned by inserting at least the tip of the positioning member 21 into the hole H to be inspected in a state where the portion of the positioning member 21 whose diameter is constant has been inserted into the positioning hole of the guide jig 20.

(Fourth Implementation)

Figure 13:
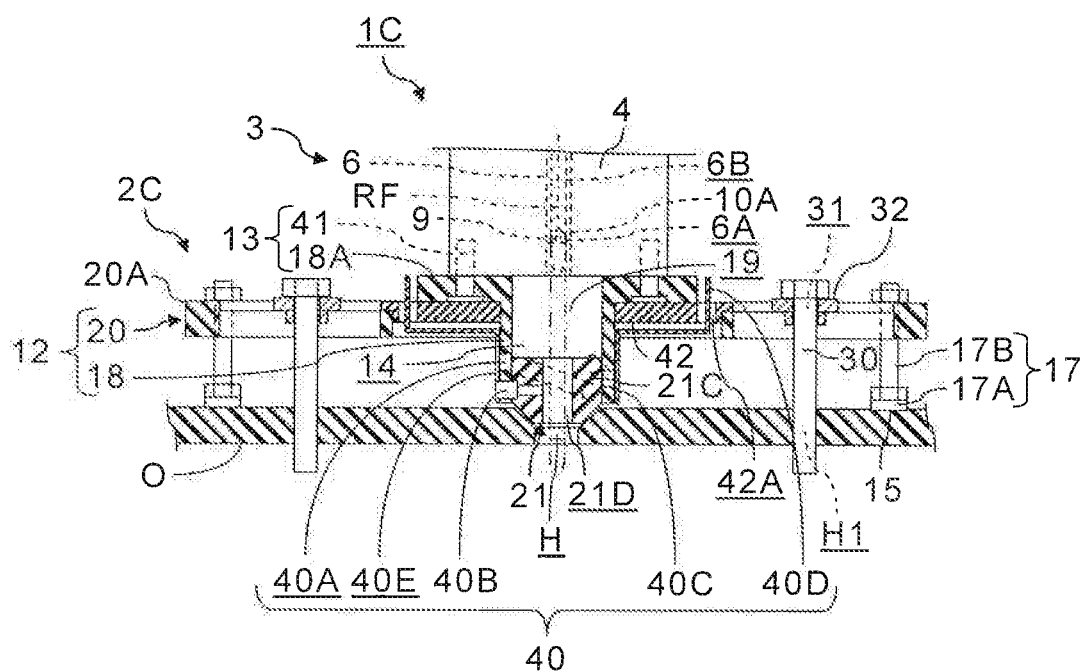
FIG. 13 shows a structure of a hole inspection device having a positioning device according to the fourth implementation of the present invention.
Figure 14:
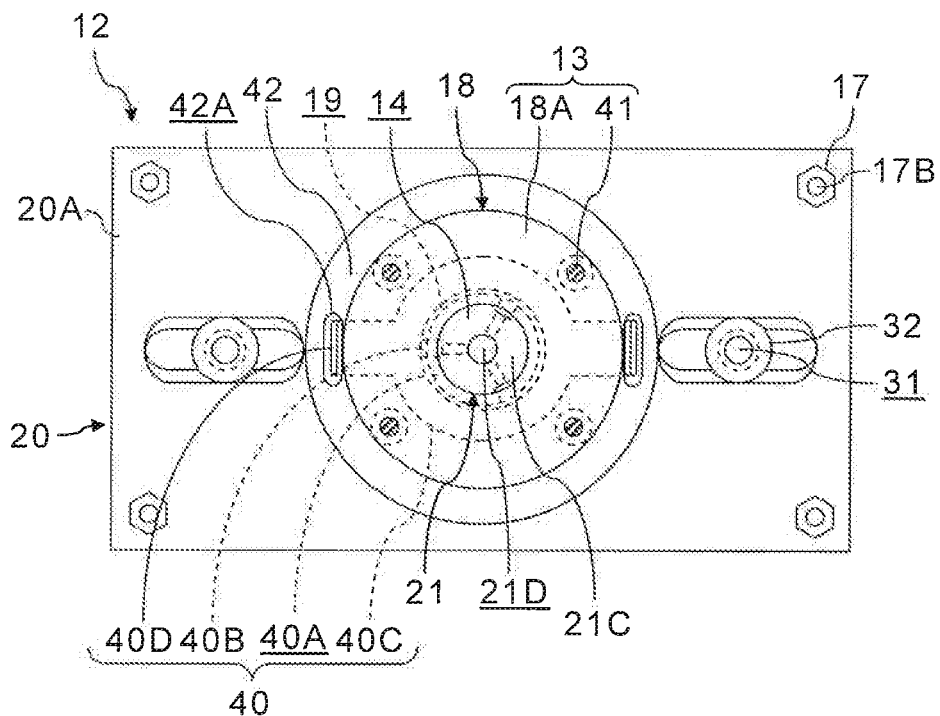
FIG. 14 is a top view of a guide unit composing the positioning device shown in FIG. 13.
Figure 15:
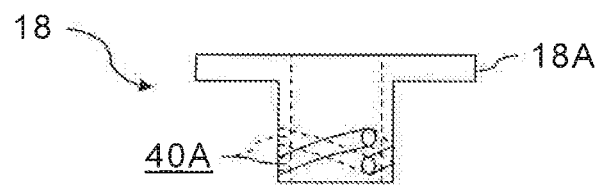
FIG. 15 is a front view of a bushing shown in FIG. 13 and FIG. 14.

FIG. 13 shows a structure of a hole inspection device 1C having a positioning device 2C according to the fourth implementation of the present invention, FIG. 14 is a top view of a guide unit 12 composing the positioning device 2C shown in FIG. 13, and FIG. 15 is a front view of a bushing 18 shown in FIG. 13 and FIG. 14.

A positioning device 2C of a hole inspection device 1C in the fourth implementation shown in FIG. 13 and FIG. 14 is different from the positioning device 2B in the third implementation mainly in a point that the tapered pin 21C has a cylindrical shape so that the tapered pin 21C having the tapered tip can be inserted into the hole H from the device main body 3 side, and the guide jig 20 has a slide mechanism 40 which is a slider for reciprocating the tapered pin 21C in the central axis direction. The same signs are attached to elements, which do not substantially differ from elements of each of the positioning devices 2, 2A and 2B in the other implementations, out of other elements of the positioning device 2C in the fourth implementation, and explanation thereof is omitted.

In the fourth implementation, the tapered pin 21C having the tapered tip is used as the positioning member 21. Specifically, the positioning member 21 composed of the cylindrical tapered pin 21C of which tip has been tapered by C-chamfering the tip is slidably disposed inside the positioning hole 14 formed as a through hole of the bushing 18 attached to the device main body 3.

In an example shown in FIG. 13 and FIG. 14, the bushing 18 is composed of a stepped bushing, and a disk-like portion 18A formed in the opening end side in which the diameter of the bushing 18 is larger is directly fixed to the casing 4 of the device main body 3 with setscrews 41. That is, the detachable member 13 which attaches the bushing 18 to the casing 4 of the device main body 3 detachably is composed of the disk-like portion 18A of the bushing 18 and the simple setscrews 41. The setscrews 41 may be commercially available screws.

Moreover, the shape of the tapered pin 21C which composes the positioning member 21 is cylindrical. Accordingly, the bar-shaped probe 6 for measuring features of the hole H to be inspected can be inserted into a through hole 21D formed at the center of the tapered pin 21C. As a result, the tip of the tapered pin 21C whose diameter gradually decreases can be inserted and retracted into and from the hole H from the same direction as that of the probe 6.

Specifically, after the tip of the tapered pin 21C has been retracted from the hole H to be inspected the probe 6 can be inserted into the hole H through the through hole 21D of the tapered pin 21C. For that purpose, the thickness of the through hole 21D of the tapered pin 21C is determined so that the tapered pin 21C may not interfere with the probe 6. In other words, an appropriate clearance is formed between the tapered pin 21C and the probe 6.

In addition, the guide unit 12 composed of the bushing 18 and the guide jig 20 can include the slide mechanism 40 which slides the positioning member 21 composed of the tapered pin 21C relatively to the positioning hole 14 of the bushing 18 in the central axis direction of the positioning member 21 and the positioning hole 14. The slide mechanism 40 can be composed of a desired mechanism which can move the tapered pin 21C in the axis direction.

In an example shown in FIG. 13 to FIG. 15, the slide mechanism 40 is composed of cylindrical or columnar members 40B which respectively slide along with spiral through grooves 40A formed on the bushing 18, and a member 40C which slides the cylindrical or columnar members 40B in the length directions of the grooves 40A respectively.

Each cylindrical or columnar member 40B can be composed of a sliding cylinder or a sliding column, such as a simple pin bolt whose head is a pin, or a part produced by coupling a roller to the head portion of a bolt. Each cylindrical or columnar member 40B is fixed to the tapered pin 21C so that the length direction may be the radial direction of the tapered pin 21C, and the head which is the pin or the roller may protrude.

Each cylindrical or columnar member 40B plays a role of transmitting force, for sliding the tapered pin 21C, to the tapered pin 21C. Therefore, the multiple members 40B as illustrated can transmit sufficient force to the tapered pin 21C although the tapered pin 21C may be single.

Meanwhile, the grooves 40A for sliding the heads of the cylindrical or columnar members 40B fixed to the tapered pin 21C respectively are formed on the bushing 18. The bushing 18 has the grooves 40A whose positions in the slide direction of the tapered pin 21C change by a distance by which the tapered pin 21C is slid in the axis direction. As a result, each groove 40A becomes a spiral shape as exemplified in FIG. 15.

The length of the head of each cylindrical or columnar member 40B is determined so that a part of the head of the member 40B may protrude from the groove 40A of the bushing 18 in the radial direction of the bushing 18 and the tapered pin 21C. Therefore, when force in the rotation direction around the axis direction of the bushing 18 and the tapered pin 21C is applied on a part of the head of each cylindrical or columnar member 40B protruding from the groove 40A of the bushing 18, the cylindrical or columnar members 40B can be slid along the grooves 40A of the bushing 18 respectively.

Accordingly, the member 40C, serving as a slider, integrated with a lever 40D can be disposed in order to slide the cylindrical or columnar members 40B in the length directions of the grooves 40A respectively as exemplified in FIG. 13 and FIG. 14.

Figure 16:
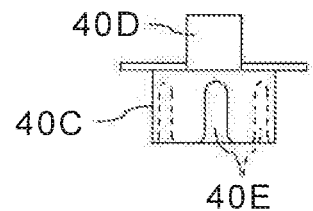
FIG. 16 is a front view of the lever shown in FIG. 13 and FIG. 14.

FIG. 16 is a front view of the lever 40D shown in FIG. 13 and FIG. 14.

The lever 40D can have a desired shape so that a user can rotate the member 40C by hand. Meanwhile, the member 40C can have a cylindrical structure having slits 40E which apply force in the rotation direction on the heads of the cylindrical or columnar members 40B respectively. Specifically, parts of the heads of the cylindrical or columnar members 40B protruding from the grooves 40A of the bushing 18 can be disposed inside the slits 40E of the cylindrical member 40C respectively. Thereby, rotating the cylindrical member 40C around the axis makes it possible to rotate the cylindrical or columnar members 40B.

As a result, each cylindrical or columnar member 40B can be slid along the groove 40A of the bushing 18, and thereby the tapered pin 21C to which the cylindrical or columnar members 40B have been fixed can be moved in parallel in the axis direction while rotating the tapered pin 21C. Specifically, the slide mechanism 40 can be configured so that, when the lever 40D is normally rotated, the tip of the tapered pin 21C can be protruded from the bushing 18 to be inserted into the hole H to be inspected while, when the lever 40D is reversely rotated, the tapered pin 21C can be retracted from the hole H to be inspected and housed inside the bushing 18.

Therefore, the change amount of the position of each groove 40A in the reciprocating direction of the tapered pin 21C is determined so as to be coincident with the length of a stroke for reciprocating the tapered pin 21C. Note that, also when the device main body 3 side is rotated while pining the lever 40D, the tapered pin 21C can be reciprocated similarly.

Moreover, the grooves 40A may be formed in the tapered pin 21C side while the cylindrical or columnar members 40B sliding along the grooves 40A respectively may be fixed to the bushing 18 so that the cylindrical or columnar members 40B may protrude from the inside of the bushing 18. In that case, the bushing 18 itself also functions as a member for sliding the cylindrical or columnar members 40B in the length directions of the grooves 40A respectively, and the tapered pin 21C can be reciprocated inside the bushing 18 by normal rotation and reverse rotation of the device main body 3 side.

That is, the grooves 40A whose positions in the slide direction of the tapered pin 21C change by a distance by which the tapered pin 21C is slid can be formed on one of the outer surface of the tapered pin 21C and the inner surface of the positioning hole 14 of the bushing 18 while the slide mechanism 40 can be composed of the cylindrical or columnar members 40B, sliding inside the formed grooves 40A respectively, composed of rollers or pins attached to the other of the outer surface of the tapered pin 21C and the inner surface of the positioning hole 14.

In an example shown in FIG. 13 and FIG. 14, the through hole 19 of the guide jig 20 for inserting the bushing 18 is formed by the disk-like member 42, and the cylindrical member 40C for rotating the cylindrical or columnar members 40B is disposed, in the back side of the disk-like member 42, coaxially to the disk-like member 42. Further, the tips of the lever 40D formed as a part of the disk-like member 42 forming the through hole 19 project to the surface side of the disk-like member 42 through slits 42A formed in the disk-like member 42.

Accordingly, when the lever 40D is pinched and rotated, the disk-like member 42 is rotated on a stepped face of the through hole formed in the main body 20A of the guide jig 20. As a matter of course, the disk-like member 42 may not be rotated by forming a circular slit between the disk-like member 42 and the main body 20A of the guide jig 20, or attaching other parts.

Moreover, the supporting columns 17 for placing the guide jig 20 on the surface of the object O are composed of four bolts 17B to which buffers 17A have been attached respectively, in an example shown in FIG. 13 and FIG. 14.

Specifically, the supporting faces 15 of the supporting columns 17 can be formed by the buffers 17A respectively so that the surface of the object O may not be damaged even when the supporting columns 17 are slid to the surface of the object O. Examples of a material of the buffers 17A include a polyamide synthetic resin, such as nylon 6,6 or nylon 4,6.

When the supporting column 17 is composed of a bar-shaped part as exemplified in FIG. 13 and FIG. 14, the supporting column 17 can be lightened while an error may arise in the position of the supporting face 15. Accordingly, an adjuster which adjusts the length of the supporting column 17 may be included.

Moreover, the member 32 or the members 32 having the insertion holes 31 may be included in the guide jig 20 so that the two holes H1 can be used for positioning the guide jig 20 when the hole H to be inspected and the holes H1 are aligned in the object O, similarly to the second implementation. In an example shown in FIG. 13 and FIG. 14, the members 32 each having the insertion hole 31 are configured to slide relatively to the main body 20A of the guide jig 20 in the arrangement direction of the insertion holes 31.

Specifically, a stepped slit 20B having an oval cross section is formed in the main body 20A of the guide jig 20 so that the length direction of the slit 20B may be the slide direction of the members 32 having the insertion holes 31 respectively. On the stepped face of the slit 20B, the members 32 composed of stepped bushings are disposed so that the members 32 can slide respectively.

Accordingly, the main body 20A of the guide jig 20 can be positioned to the holes H1 formed in the object O by the two pins 30, such as pin bolts, with sliding the members 32 having the insertion holes 31 according to the positions of the holes H1 of the object O as exemplified in FIG. 13. As a result, the slide direction of the supporting columns 17 and the main body 20A of the guide jig 20 relative to the object O can be limited to one direction when the guide unit 12 including the tapered pin 21C is positioned with centering the hole H by pressing the tip of the tapered pin 21C to the hole H.

Figure 17:
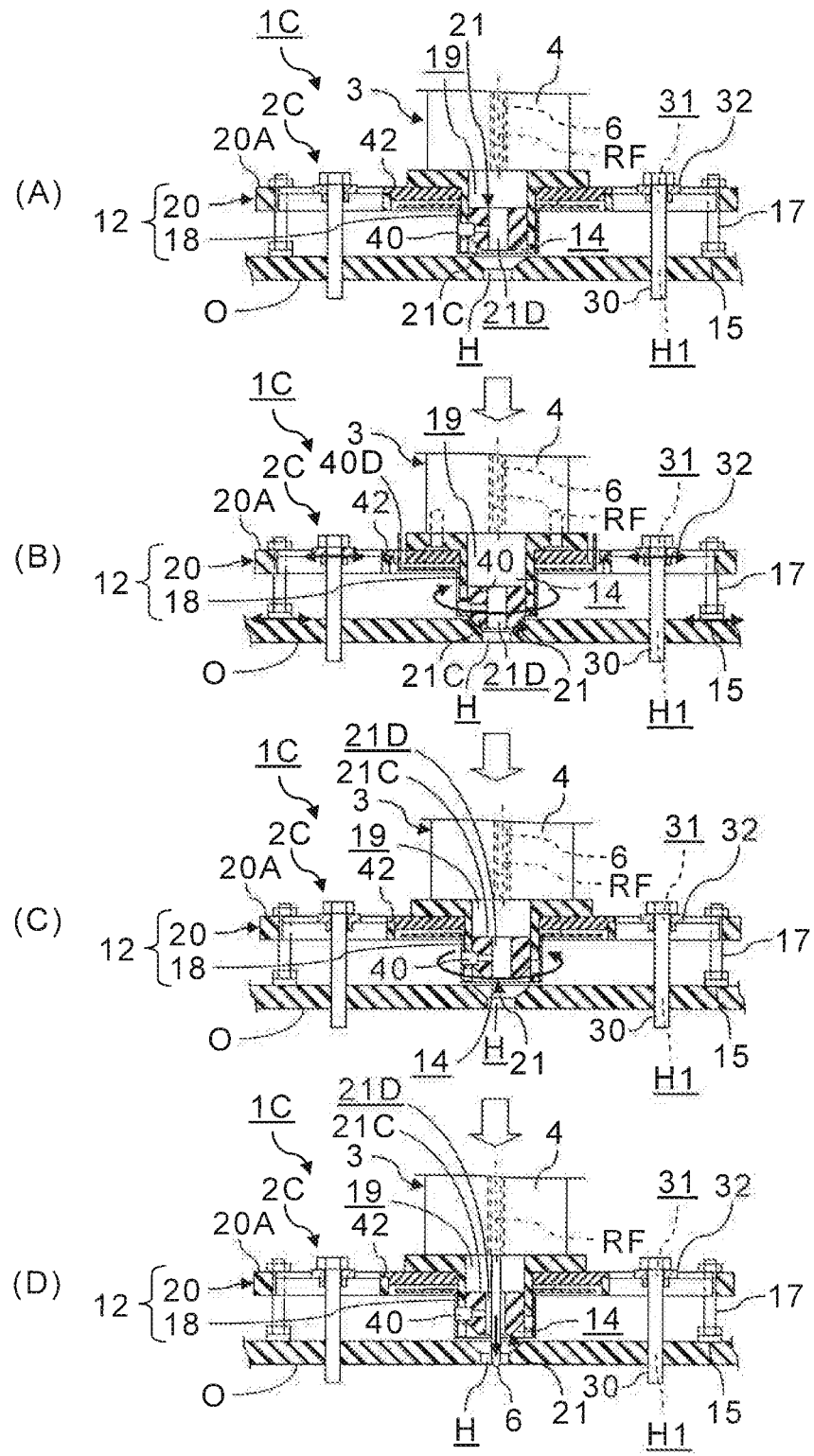
FIG. 17 shows a procedure of inspecting the hole to be inspected, formed in the object, with positioning the hole inspection device by the positioning device shown in FIG. 13.

FIG. 17 shows a procedure of inspecting the hole H to be inspected, formed in the object O, with positioning the hole inspection device 1C by the positioning device 2C shown in FIG. 13.

When the hole H formed in the object O is intended to be inspected with positioning the hole inspection device 1C by the positioning device 2C as shown in FIG. 13, the main body 20A of the guide jig 20 to which the supporting columns 17 have been attached is placed on the surface of the object O firstly as shown by (A) of FIG. 17. When the two holes H1 are formed on the object O in a line with the hole H, the main body 20A of the guide jig 20 can be positioned by sliding the members 32 according to the positions of the holes H1, and inserting the common pins 30 in the insertion holes 31 of the members 32 and the holes H1 of the object O respectively. As each pin 30, a pin bolt may be used as shown in FIG. 17. Alternatively, a wedgelock temporary fastener which can be fixed from one way may be used as exemplified in FIG. 10.

Moreover, the device main body 3 of the hole inspection device 1C, to which the bushing 18 housing the tapered pin 21C has been attached, is set to the main body 20A of the guide jig 20. The bushing 18 is set to the main body 20A of the guide jig 20 in the state where the bushing 18 is inserted into the through hole 19 of the disk-like member 42. When the disk-like member 42 is detachable from the main body 20A of the guide jig 20 as illustrated, the device main body 3, the tapered pin 21C, the bushing 18, and the like can be set to the main body 20A of the guide jig 20, together with the disk-like member 42. Meanwhile, when the disk-like member 42 has been coupled to the main body 20A of the guide jig 20, the disk-like member 42, the device main body 3, the tapered pin 21C, the bushing 18, and the like can be placed on the surface of the object O in a state where the disk-like member 42 has been coupled to the main body 20A of the guide jig 20.

When the hole inspection device 1C has been placed on the surface of the object O as described above, the central axis direction of the bushing 18, the positioning hole 14 and the tapered pin 21C becomes parallel to the central axis direction of the hole H to be inspected since the normal directions of the supporting faces 15 formed on the end parts of the supporting columns 17 respectively and the central axis directions of the pins 30 are each perpendicular to the surface of the object O.

Next, the tip of the tapered pin 21C is protruded from the bushing 18 by normally rotating the lever 40D, and thereby the tip of the tapered pin 21C is pressed against the hole H to be inspected as shown by (B) of FIG. 17. Accordingly, drag partially acts on the tip of the tapered pin 21C from the edge of the hole H to be inspected. The drag acting on the tip of the tapered pin 21C includes component perpendicular to the central axis direction of the hole H to be inspected. Therefore, the bushing 18, the main body 20A of the guide jig 20, the device main body 3, and the like slide together with the tapered pin 21C in the slide direction of the members 32 positioned by the pins 30 until the drag applied on the tip of the tapered pin 21C balances.

As a result, the central axis direction of the bushing 18, the positioning hole 14 and the tapered pin 21C, and the central axis of the hole H to be inspected become on a same straight line. Thereby, the reference line RF of the hole inspection device 1C and the central axis direction of the hole H to be inspected also become on the same straight line. That is, positioning the hole inspection device 1C is completed.

Next, the tip of the tapered pin 21C is retracted from the hole H by reversing the lever 40D as shown by (C) of FIG. 17. Thereby, the edge of the hole H to be inspected is exposed to space, and it becomes possible to start inspection of the hole H including the edge.

Next, the probe 6 of the hole inspection device 1C is protruded from the casing 4 of the device main body 3 by utilizing the through hole 21D of the tapered pin 21C, and then the tip of the probe 6 is inserted into the inside of the hole H to be inspected as shown by (D) of FIG. 17. Then, the hole H can be inspected by irradiating the inner surface of the hole H with the laser light L from the probe 6. At this time, it is also possible to irradiate the edge of the hole H with the laser light L since the tapered pin 21C has been evacuated from the hole H. Accordingly, a chamfered shape and the like of the hole H can also be measured.

In the above-mentioned fourth implementation, the through hole 21D for passing the probe 6 through is formed at the center of the tapered pin 21C, which is configured to reciprocate in the axis direction. Therefore, according to the fourth implementation, it becomes possible in the same side to position the device main body 3 by pressing the tapered pin 21C to the hole H to be inspected and inspect the hole H by inserting the probe 6 into the hole H, in a state where the device main body 3 has been set to the guide jig 20.

Note that, also in a case where the positioning is performed by inserting the portion of the pin 21A having a constant diameter into the hole H to be inspected as exemplified in FIG. 9, a through hole can be formed in the pin 21A, and the pin 21A can be configured to reciprocate in the axis direction, similarly to a case of inserting only the tip of the tapered pin 21C. In that case, positioning by inserting the pin 21A into the hole H to be inspected and inspection by inserting the probe 6 into the hole H become possible to be conducted from the same direction in a state where the device main body 3 has been set to the guide jig 20.

Moreover, when measuring or inspecting features of the edge of the hole H is unnecessary, the positioning member 21, such as the tapered pin 21C or the simple pin 21A, may have only a hollow structure by omitting the slide mechanism 40 which reciprocates the positioning member 21 in the axis direction. In that case, it is necessary to fix the positioning member 21 so that at least the tip of the positioning member 21 may protrude from the positioning hole 14 of the bushing 18.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A positioning device that positions a hole inspection device to a hole to be inspected formed in an object, the hole inspection device, having at least one of a probe and a sensor, measuring or inspecting, with the at least one of the probe and the sensor, a feature of the hole to be inspected, the positioning device comprising:
    a guide unit having a positioning hole and a flat supporting face, a cylindrical or columnar positioning member being composed of at least one of a positioning cylinder and a positioning column slidably inserted into the positioning hole, at least a tip of the positioning member being inserted into the hole to be inspected, a central axis of the positioning hole and a reference line of the hole inspection device for measuring or inspecting the feature of the hole to be inspected lying on a same straight line, the guide unit being set by contacting the flat supporting face to a surface of the object surrounding the hole to be inspected or a flat surface of a jig placed on the object; and
    a detachable member having threading, the detachable member attaching, with the threading, a part or all of the guide unit to the hole inspection device,
    wherein the guide unit has at least one supporting column for preventing the guide unit from contacting to at least an edge of the hole to be inspected, the flat supporting face being formed on an end face of the at least one supporting column, and
    wherein the guide unit includes:
    a bushing having the positioning hole; and
    a guide jig having the at least one supporting column and a through hole for inserting the bushing.

2. The positioning device according to claim 1, wherein the guide unit has at least one supporting column for preventing the guide unit from contacting the adjacent most edge of the hole to be inspected, the flat supporting face being formed on an end face of the at least one supporting column.

3. The positioning device according to claim 2, wherein the at least one supporting column includes supporting columns or a cylindrical tubular supporting column that prevents the guide unit from interrupting at least a columnar space adjacent to the guide unit in a supporting column side, the columnar space having a diameter larger than a diameter of the positioning hole, the central axis of the positioning hole and a central axis of the columnar space lying on the same straight line.

4. The positioning device according to claim 2, wherein the supporting face is perpendicular to the central axis of the positioning hole.

5. The positioning device according to claim 1, wherein the guide unit includes the positioning member of which diameter decreases gradually toward the tip, the positioning member having a portion of which diameter is constant.

6. The positioning device according to claim 5,
    wherein the guide unit includes the cylindrical positioning member having a centered through hole for inserting the probe composed of a bar-shaped probe for measuring or inspecting the feature of the hole to be inspected, and
    the cylindrical positioning member is slidably disposed in the positioning hole so that the tip having the gradually decreasing diameter can be inserted and retracted into and from the hole to be inspected in a direction same as a direction in which the bar-shaped probe is inserted and retracted into and from the hole to be inspected.

7. The positioning device according to claim 6, wherein the guide unit includes a first slider that slides the cylindrical positioning member relatively to the hole to be inspected in a central axis direction of the cylindrical positioning member and the hole to be inspected.

8. The positioning device according to claim 7,
    wherein the first slider includes:
    a first cylindrical or columnar member including a first sliding cylinder or a first sliding column that slides in a groove formed on one of an outer surface of the cylindrical positioning member and an inner surface of the positioning hole, a position of the groove changing in a slide direction of the cylindrical positioning member, the first member being attached to an other of the outer surface of the cylindrical positioning member and the inner surface of the positioning hole; and
    a second member, including a second slider that slides the first member in a length direction of the groove.

9. The positioning device according to claim 1,
    wherein the guide jig includes:
    a member, including at least one of a plate, a block, another bushing or a bearing forming the through hole for inserting the bushing; and
    an adjuster that moves the member in parallel, relatively to the at least one supporting column, in a direction perpendicular to the central axis of the positioning hole.

10. The positioning device according to claim 1, wherein the guide jig includes the bearing composed of a spherical slide bearing forming the through hole for inserting the bushing.

11. The positioning device according to claim 1,
    wherein the guide jig includes:
    a first member, including at least one of a first plate, a first block, a first bushing or a first bearing forming the through hole for inserting the bushing;
    at least one second member, including at least one of a second plate, a second block, second bushings or second bearings forming at least two insertion holes for respectively inserting at least two pins respectively inserted in at least two holes formed on the object, central axes of the at least two holes and a central axis of the hole to be inspected lying on a same plane; and an adjuster that moves the first member in parallel, relatively to the at least one second member, in an alignment direction of the at least two insertion holes.

12. The hole inspection device comprising the positioning device according to claim 1.

13. The hole inspection device according to claim 12, comprising:

the probe, composed of a non-contact probe that irradiates an inner surface of the hole to be inspected with a laser light and inputs a reflected light of the laser light.

14. A method of positioning the hole inspection device comprising:

using the positioning device according to claim 1.

15. A hole inspection method comprising:

measuring or inspecting the feature of the hole to be inspected, using the hole inspection device positioned by the method according to claim 14.

16. The hole inspection method according to claim 15, wherein the feature of the hole to be inspected including a shape of an edge of the hole to be inspected is measured or inspected after the positioning member has been pulled out from the hole to be inspected.

17. A method of positioning the positioning device of claim 1, the method comprising:

setting the guide unit having the positioning hole and the flat supporting face by attaching a part or all of the guide unit to the hole inspection device with the threading of the detachable member and contacting the flat supporting face to a surface of the object surrounding the hole to be inspected or a flat surface of a jig placed on the object, a central axis of the positioning hole and a reference line of the hole inspection device lying on a same straight line; and positioning the hole inspection device to the hole to be inspected by inserting a cylindrical or columnar positioning member, composed of at least one of a positioning cylinder and a positioning column, into the hole to be inspected and the positioning hole simultaneously.

18. The method of positioning the hole inspection device according to claim 17, wherein the positioning member is pulled out from the positioning hole and the hole to be inspected before the probe of the hole inspection device is inserted into the hole to be inspected.

\* \* \* \* \*